(No Model.)
D. B. HENRY.
PLANTER AND CULTIVATOR.
No. 400,456. Patented Apr. 2, 1889.
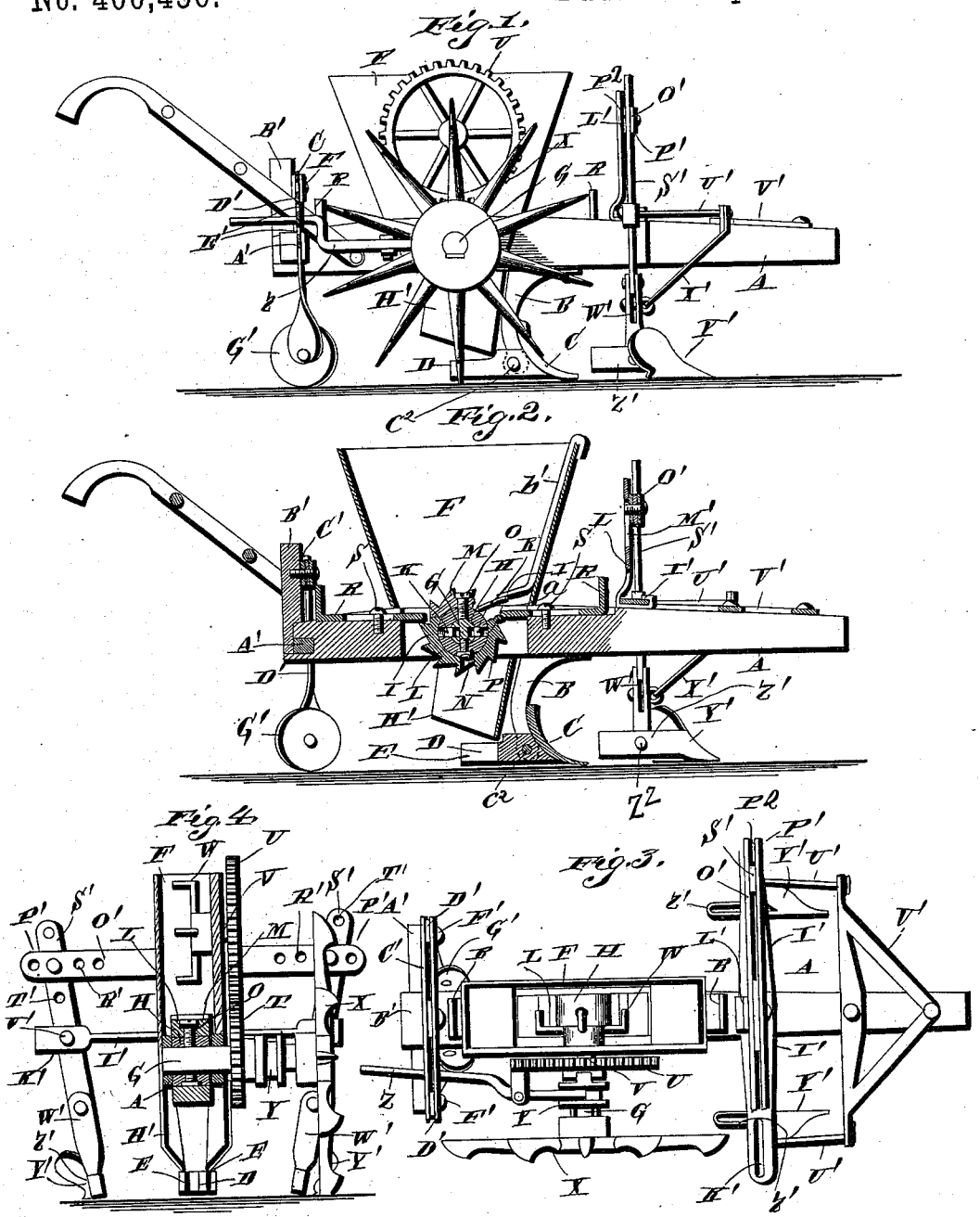
Witnesses.
C. S. Taylor,
J. W. Garner
Inventor,
Dennis B. Henry.
By his Attorneys
C. A. Knowles

UNITED STATES PATENT OFFICE.

DENNIS B. HENRY, OF INDIAN BAYOU, LOUISIANA.

PLANTER AND CULTIVATOR.

SPECIFICATION forming part of Letters Patent No. 400,456, dated April 2, 1889.

Application filed April 13, 1888. Serial No. 270,537. (No model.)

*To all whom it may concern:*

Be it known that I, DENNIS B. HENRY, a citizen of the United States, residing at Indian Bayou, in the county of Vermillion and State of Louisiana, have invented a new and useful Improvement in Planters and Cultivators, of which the following is a specification.

My invention relates to an improvement in planters and cultivators; and it consists in the peculiar construction and combination of devices that will be more fully set forth hereinafter, and particularly pointed out in the claims.

In the accompanying drawings, Figure 1 is a side elevation of a planter and cultivator embodying my improvements. Fig. 2 is a vertical longitudinal sectional view of the same. Fig. 3 is partly a horizontal section and partly a top plan view. Fig. 4 is a transverse sectional view.

A represents a beam, which is similar to a plow-beam.

B represents the standard, which depends from the beam at a suitable distance from the front end thereof, and C represents a furrow-opening plow, which is provided with a rearward-extending sole, D. The said sole is pivoted at a suitable distance in rear of the plow to the lower end of the stand, at and in rear of said standard. The said sole is bifurcated to form the pair of rearward-diverging wings E. By reason of the pivotal bolt $c^2$, which secures the furrow-opener plow to the standard, said plow may be adjusted to any desired inclination.

F represents a hopper, which is secured on the plow-beam at a suitable distance in rear of standard B. In bearings which are formed in the sides of the hopper and in the plow-beam is journaled a transverse shaft, G, one end of which projects for a suitable distance beyond one side of the beam. To that portion of the shaft which extends through a vertical central opening in the beam, and which forms the discharge-opening of the hopper, is keyed a circular seed-wheel, H, of suitable width and diameter. The said seed-wheel is provided with a series of seed cups or depressions, I, in its periphery, and in each of the said seed-cups is screwed a plug, K, which forms the bottom thereof. The said plugs may be turned until their outer sides are flush with the periphery of the seed-wheel, or they may be turned or screwed inward in the seed-cups or depressions to make the same of any suitable depth, and thereby adapt the seed cups or depressions to hold any desired number of seeds.

L represents a cotton-seed-feed ring, which is provided on one side with a removable section, M, and has on its lower side an opening, N, with which the seed-cups I successively register. The removable section M is provided with a screw, O, by means of which it may be secured to the ring and to the seed wheel or disk H, so as to cause the said ring to rotate with the seed wheel or disk. The ring L and the section M thereof are provided with peripheral teeth P, which are similar to ratchet-teeth.

R represents a pair of slides, which are arranged in longitudinal recesses on the upper side of the beam A in front and rear of the hopper. The said slides are provided with longitudinal slots, through which extend screws S, which secure the same to the beam while allowing the slides to be moved longitudinally. When the slides are moved inward toward each other, their inner ends may be engaged with the feed-wheel L, so as to prevent the latter from rotating, and when the slides are moved outward they are disengaged from the said ring and enable the same to rotate with the seed-wheel.

T represents a spur-pinion, which is journaled loosely on the shaft G, bears against one side of the hopper, and is provided on its outer side with a series of notches, which form one section or member of a clutch.

U represents a spur-wheel, which is secured to a shaft, V, journaled in one side of the hopper. The said spur-wheel meshes with the pinion T, and to the inner end of the shaft V are secured a series of radial stirring-arms, W.

X represents a walking-wheel, which is keyed to the projecting ends of the shaft V and has a series of radial arms or spokes, the outer ends of which are pointed and adapted to engage the soil, whereby the said walking-wheel and the shaft are rotated when the machine is drawn forward.

A clutch, Y, is feathered on the shaft G and is adapted to be moved in or out thereon, so as to engage or disengage the pinion T by means of a lever, Z, which is of the ordinary construction, and which is fulcrumed on a bracket-arm that projects from one side of the beam.

Secured to the rear end of the beam is a cross-bar, A', which is arranged in a horizontal plane, and also projecting from the rear end of the beam is a vertical arm, B'.

C' represents a link, the center of which is pivoted to the upper end of standard B', and D' represents a pair of depending standards or arms, which have their upper ends pivoted to the ends of the link. The said standards or arms D' pass through vertical slots in the ends of the cross-bar A', and are provided with a series of openings, E', which are adapted to be engaged by bolts F', that extend through the ends of the cross-bar, said openings and said bolts serving to secure said standards or arms at any desired vertical adjustment, and thereby enabling the lower end of said standards or arms to be raised or lowered from the ground. The said lower ends of said standards or arms are twisted or arranged obliquely, as shown, and on the inner front sides thereof are journaled circular covering-disks G'. Inasmuch as the arms or standards D' are adapted to be raised and lowered, it follows that this movement is imparted to the covering-disks, and hence the latter will be caused to work at any desired depth in the soil.

It will be understood from the foregoing description and by reference to the drawings that when one of the standards is raised the other is lowered, thereby enabling the covering-disks to throw the earth into the furrow made by the furrow-opening from either side.

H' represents a seed spout or conveyer, which is attached to the under side of the beam A and extends downward from the discharge-opening under the hopper to the rearward-extending sole of the furrow-opener, the function of this spout being to direct the seed when discharged from the hopper into the furrow, as will be readily understood.

I' represents a cross-bar, which is secured on the beam A at a suitable distance from the front end thereof. The ends of this cross-bar are provided with slots K'.

L' represents the vertical standard, which rises above the center of the cross-bar I', and is provided with a vertical slot, M'. A bar, O', is provided at its center with a clamping-bolt, which extends through the slot M', and by this means the link-bar is pivoted to the standard L', and is adapted to be secured thereto at any desired vertical adjustment.

P' represents the outer ends of the link-bar O', that are provided with vertical slots P² and with openings R', which are arranged at suitable distances apart.

S' represents a pair of vertical bars or standards, which are provided with openings T'. The said bars or standards pass through the slots at the outer ends of bar I' and link-bar O', secured to the latter at any desired vertical and lateral adjustment by means of bolts, as shown, and are secured to the former at any desired vertical adjustment by means of bolts U', which extend forward from the bar L'.

V' represents a triangular brace, which is arranged on the upper side of the plow-beam, at the front end thereof, and is bolted thereto. The outer corners or angles of the brace are engaged by the bolts U', said brace thereby serving to strengthen the cross-bar L'.

W' represents a pair of feet or standards, which are pivoted to the lower ends of the standards S', and are connected to the corners of the brace V' by means of stay-rods X'. To the lower ends of the said feet or standards are pivoted cultivating-shovels Y', the mold-boards of which extend in opposite directions, as shown in Figs. 3 and 4, the said cultivating-shovels being provided with rearward-extending landsides Z', through which the pivotal bolts Z² extend.

By reason of the openings in the standards I' and in the cross-bar O', said standards S' may be secured at any desired vertical adjustment and lateral inclination, and consequently the cultivating-shovels may be caused to operate in the ground at any desired distance apart.

The operation of my invention is as follows: When the machine is to be used for planting corn, the cultivating-shovels are dispensed with, the slides R are caused to engage the feed-ring L, so as to secure the latter in the position indicated in Fig. 2, and the section M at the upper side of said feed-ring is removed, thereby exposing the upper side of the periphery of seed-wheel H. As the machine is drawn across the field, rotary motion is imparted to the shaft G by the walking-wheel, as will be readily understood, and to the seed-wheel H, thereby causing the latter to revolve in the seed-ring, the latter being held firmly against rotation by the slides. As each seed-cup in succession comes under the open space in the feed-ring formed by the removal of the section M, the said seed-cup becomes filled with seeds, and as each seed-cup moves past the opening N in the bottom of the seed-ring the contents thereof are discharged through said opening into the spout and from the latter into the furrow. A brush, a, is caused to bear upon the upper side of the seed-wheel, so as to remove the surplus seeds from the seed-cups, and said brush is supported in position by means of an arm, b', which is adapted to engage the front upper edge of the hopper. When the clutch is in gear with the pinion, the latter communicates rotary motion to the stirring-arms in the hopper through the large seed-wheel, and said stirring-arms keep the contents of the hopper agitated, and thereby keep the seeds from lodging therein. When it is desired to plant cotton-seeds, the section M is secured in place on the ring L, thereby clamping the latter firmly to the revoluble seed wheel or disk, and the brush hereinbefore described is removed and the slides disengaged from the ring L, so that the latter is caused to rotate with the seed wheel or disk, and the teeth thereof engage the cotton-seed, which come in contact therewith and force the same through the discharge-opening of the hopper into the seed-spout.

Having thus described my invention, I claim—

1. The combination, in an interchangeable cotton and corn planter, of the hopper, the revoluble seed disk or wheel H, having the peripheral seed cups or openings, the toothed feed-ring L, loosely mounted on said seed disk or wheel and provided with the discharge-opening N and the removable section M, and means, substantially as set forth, to lock the ring against rotation when the section M is removed, substantially as described.

2. The combination, in a planter, of the hopper, the revoluble seed wheel or disk arranged under the discharge-opening thereof and provided with the peripheral seed cups or depressions, the peripheral tooth-ring L, loosely mounted on the seed wheel or disk, having the opening N and the removable section M, and the slides R, adapted to engage and disengage the teeth of ring L, for the purpose set forth, substantially as described.

3. The combination, in a planter, of the pivoted link-arm C', the vertically-movable standards connected thereto, and the covering-disks journaled at the lower ends of said standards, substantially as described.

4. The combination, in a planter, of a frame or beam, the furrow-opener, the hopper, the driving-shaft having the operating-wheel engaging the ground, the seed wheel or ring secured to the shaft and arranged in the side opening of the hopper, the pinion loose on the shaft, the clutch to throw the same into or out of engagement with the shaft, the gear-wheel engaged by the pinion, and having the shaft journaled in the hopper and provided with the stirring-arms, substantially as described.

In testimony that I claim the foregoing as my own I have hereto affixed my signature in presence of two witnesses.

DENNIS B. HENRY.

Witnesses:
O. H. O'BRYAN,
J. M. FRASER.